United States Patent
Chuang

(10) Patent No.: US 9,649,761 B2
(45) Date of Patent: May 16, 2017

(54) BIKE REPAIR STAND

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 0 days.

(21) Appl. No.: 15/073,702

(22) Filed: Mar. 18, 2016

(65) Prior Publication Data

US 2016/0297063 A1 Oct. 13, 2016

(30) Foreign Application Priority Data

Apr. 8, 2015 (TW) .............................. 104111198 A

(51) Int. Cl.
| | |
|---|---|
| *A47F 5/00* | (2006.01) |
| *B25H 1/00* | (2006.01) |
| *F04B 39/12* | (2006.01) |
| *F04B 53/14* | (2006.01) |
| *F04B 53/10* | (2006.01) |
| *F04B 53/16* | (2006.01) |
| *B62H 3/02* | (2006.01) |
| *F04B 33/00* | (2006.01) |

(52) U.S. Cl.
CPC ............. *B25H 1/0014* (2013.01); *B62H 3/02* (2013.01); *F04B 33/005* (2013.01); *F04B 39/12* (2013.01); *F04B 53/10* (2013.01); *F04B 53/14* (2013.01); *F04B 53/16* (2013.01)

(58) Field of Classification Search
CPC ....... B25H 1/0014; B62H 3/02; F04B 33/005; F04B 39/12; F04B 53/10; F04B 53/14; F04B 53/16
USPC ............ 248/125.1, 165, 166, 170, 404, 434; 211/17, 22
See application file for complete search history.

(56) References Cited

U.S. PATENT DOCUMENTS

| | | | | |
|---|---|---|---|---|
| 2,646,956 | A * | 7/1953 | Cadwell ................. | F16M 11/28 248/170 |
| 5,320,227 | A * | 6/1994 | Minoura ............... | B25H 1/0014 211/22 |
| 5,947,706 | A * | 9/1999 | Gapinski ............... | F04B 33/005 248/125.1 |
| 2005/0056740 | A1* | 3/2005 | Chuang .................... | B62H 3/12 248/176.1 |
| 2008/0272264 | A1* | 11/2008 | Carlson .................... | B62H 3/02 248/354.4 |
| 2014/0151527 | A1* | 6/2014 | Sawhney ............. | F16M 11/242 248/542 |
| 2015/0231780 | A1* | 8/2015 | Hirokawa ............ | B25H 1/0014 224/518 |

FOREIGN PATENT DOCUMENTS

TW             M477362 U        5/2014

* cited by examiner

*Primary Examiner* — Gwendolyn Baxter
(74) *Attorney, Agent, or Firm* — Alan D. Kamrath; Kamrath IP Lawfirm, P.A.

(57) ABSTRACT

A bike repair stand includes a stand column, a leg mechanism including a slider, two first links, and two second links. The slider is able to slide on the stand column. Each of the two first links is pivotally joined to the slider and has an end adapted to abut the ground. Each of the two second links is pivotally joined to the stand column and one of the first links. A head seat is located on the stand column. A support mechanism includes a pole and two support levers. The pole is able to slide on the head seat. The two support levers are respectively fixed to two ends of an axle. The two support levers are pivotal with respect to the pole about the axle.

10 Claims, 15 Drawing Sheets

BIKE REPAIR STAND

BACKGROUND OF THE INVENTION

1. Field of the Invention

The present invention relates to a repair stand and, particularly, to a bike repair stand.

2. Description of the Related Art

TW Pat. No, M477362 shows an air pump and a bike repair stand including legs and brackets releasably mounted on the air pump. The rear end of a bike can be lifted off the ground when repairing the bike, with the bracket lifting the bike from the chain stay of the bike. In addition, the legs are at a deployed position to enable the bike to be stably supported.

As set forth, the brackets are supported by the air pump. Therefore, a bike that is lifted by the brackets will apply its weight to the air pump. In this regard, the weight of the bike is a concern to avoid damaging the air pump. Furthermore, the positions of the bracket are limited by the small size of the air pump. Additionally, the bike is not restrained in a manner that it can be lifted off the ground completely.

The present invention is, therefore, intended to obviate or at least alleviate the problems encountered in the prior art.

SUMMARY OF THE INVENTION

According to the present invention, a bike repair stand includes a main body including a stand column. The stand column has a bottom end and a top end and extends therebetween along a first vertical axis. A leg mechanism is located adjacent to the bottom end of the stand column and includes a slider, two first links, and two second links. The slider is disposed between the bottom and top ends of the stand column and is able to slide along the first vertical axis. Each of the two first links has a first end pivotally joined to the slider, a second end adapted to abut the ground, and a median located between the first and second ends. Each of the two second links has a first end pivotally joined to the bottom end of the stand column and a second end pivotally joined to the median of one of the first links. A head seat is located adjacent to the top end of the stand column. A support mechanism includes a pole and two support levers. The pole is disposed on the head seat and is able to slide along a second vertical axis such that the pole has relative positions with respect to the stand column. The second vertical axis is parallel to the first vertical axis. The two support levers are disposed side by side and are respectively arranged on two sides of the pole. The two support levers are respectively fixed to two ends of an axle. The axle extends radially to the second vertical axis. The two support levers are pivotal with respect to the pole about the axle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

It is therefore an objective of the present invention to provide a bike repair stand by which a bike, no matter what sizes, can be lifted off the ground and allows a person to repair the bike without suffering a problem that the bike unsteadily wobbles relative to the bike repair stand.

It is another objective of the present invention that the bike repair stand includes a pump system.

Other objectives, advantages, and new features of the present invention will become apparent from the following detailed description of the invention when considered in conjunction with the accompanied drawings.

DETAILED DESCRIPTION OF THE INVENTION

Figure 1:
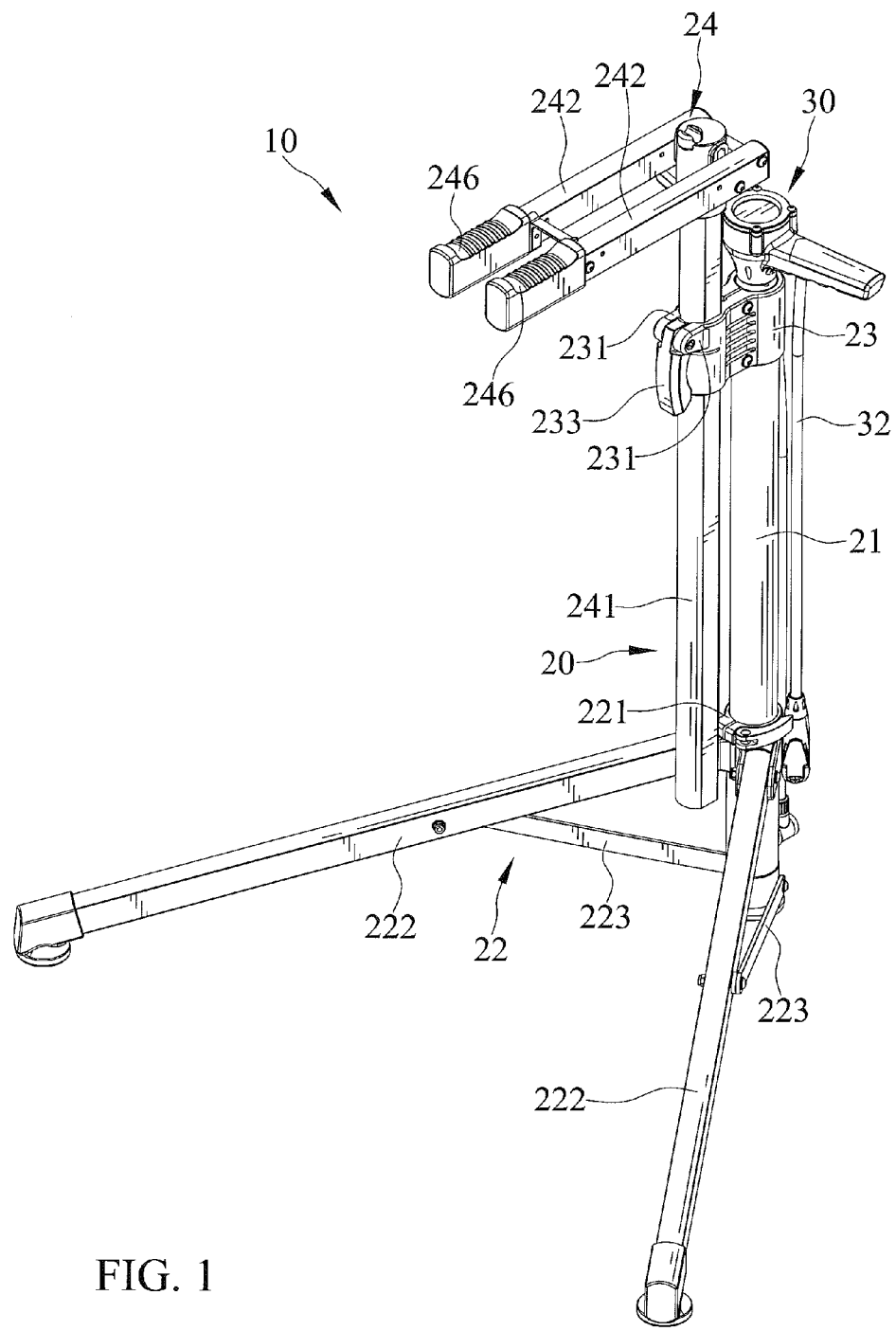
FIG. 1 is a perspective view of a bike repair stand in accordance with a first embodiment of the present invention.
Figure 2:
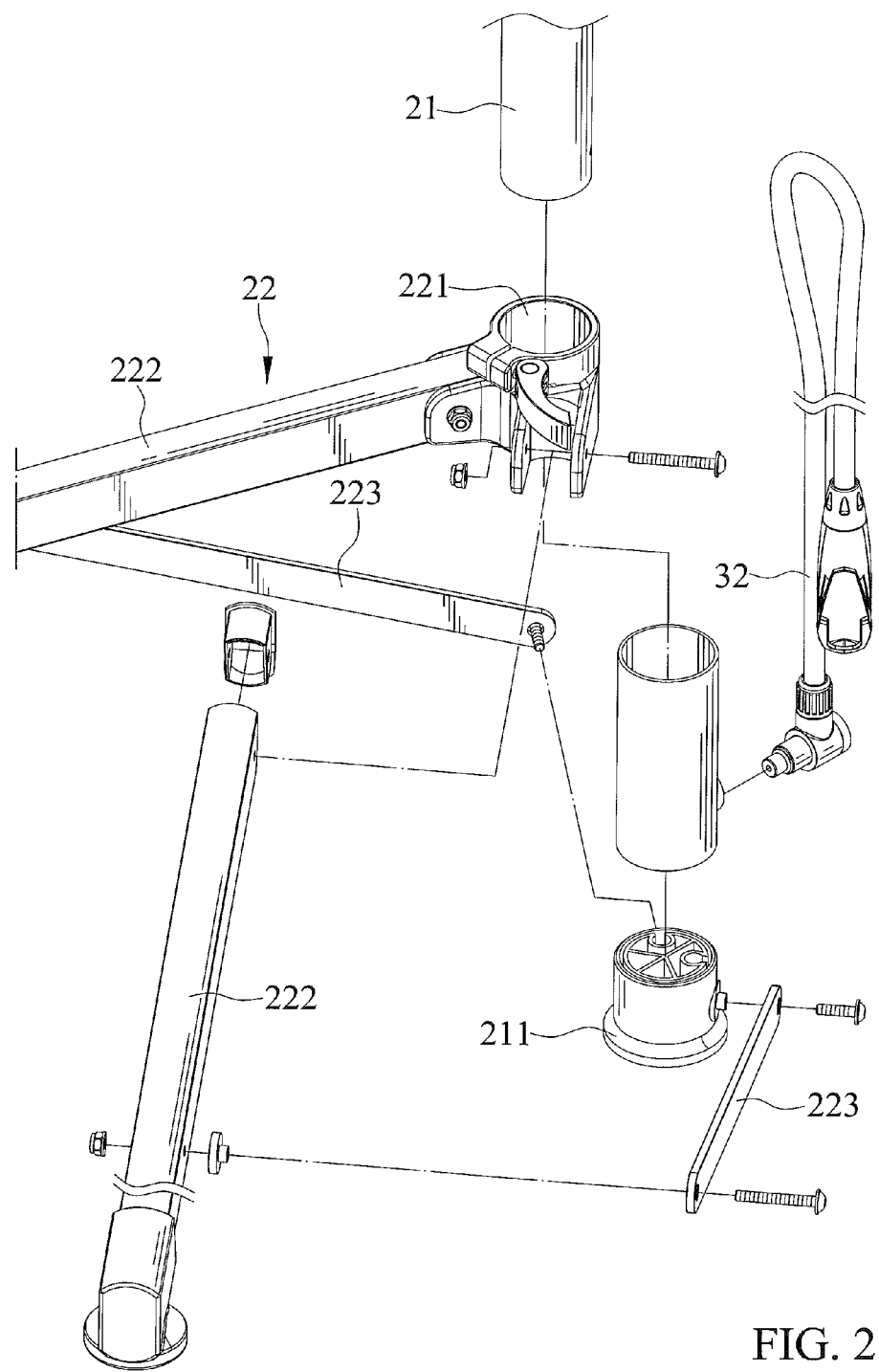
FIG. 2 is a partial, exploded perspective view of the bike repair stand of FIG. 1.
Figure 3:
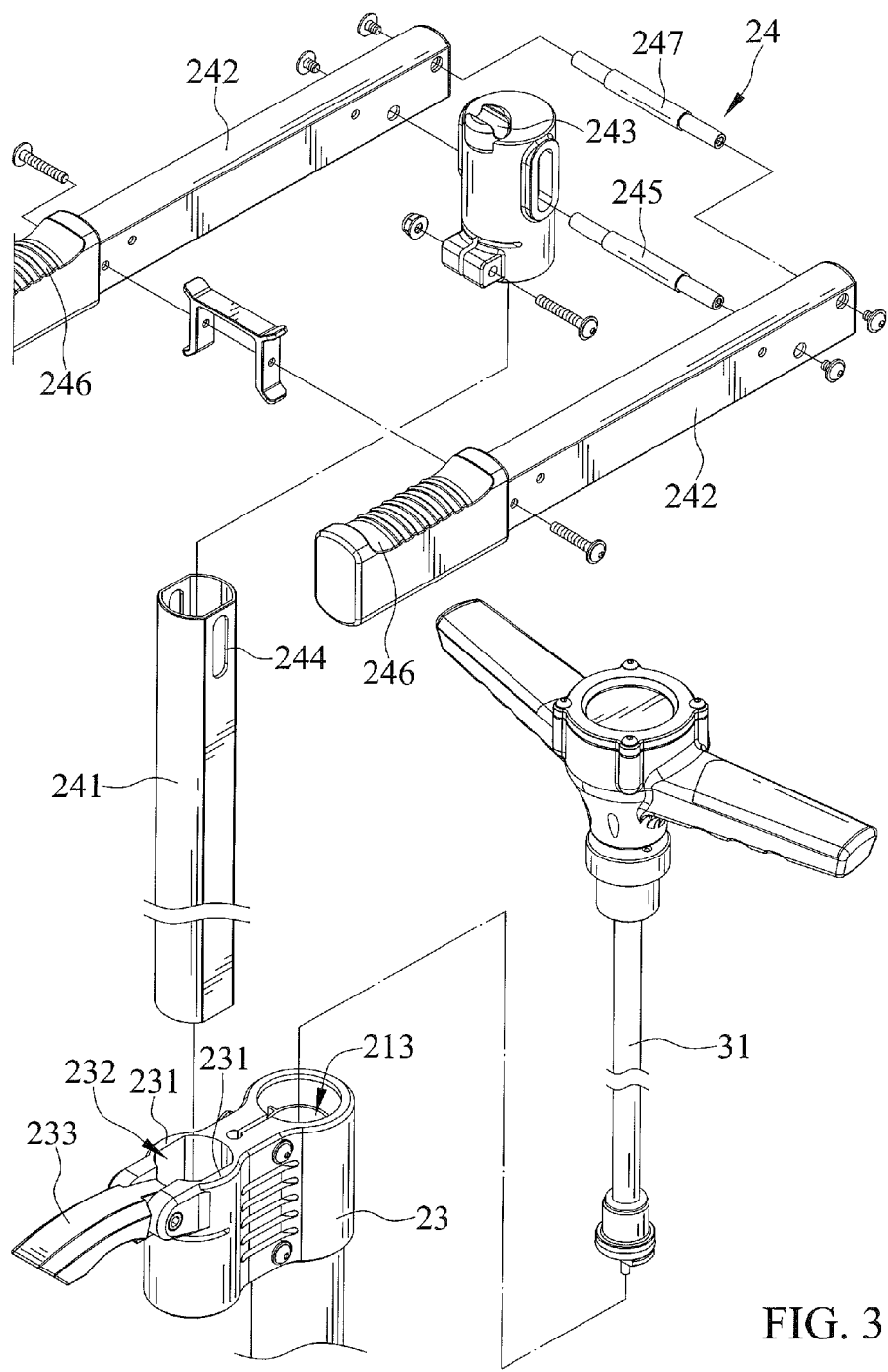
FIG. 3 is another partial, exploded perspective view of the bike repair stand of FIG. 1.
Figure 4:
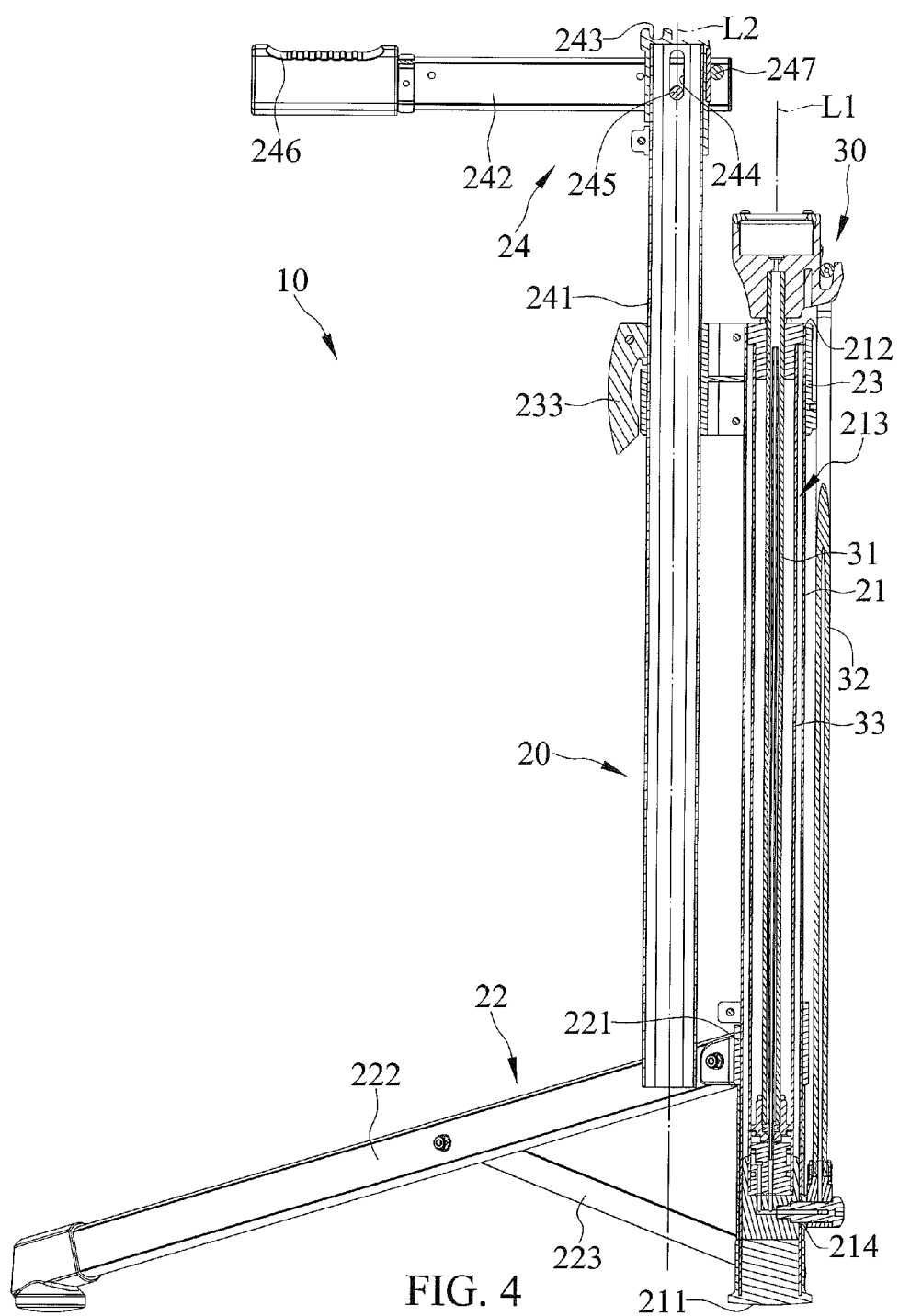
FIG. 4 is a cross-sectional view of the bike repair stand of FIG. 1.
Figure 5:
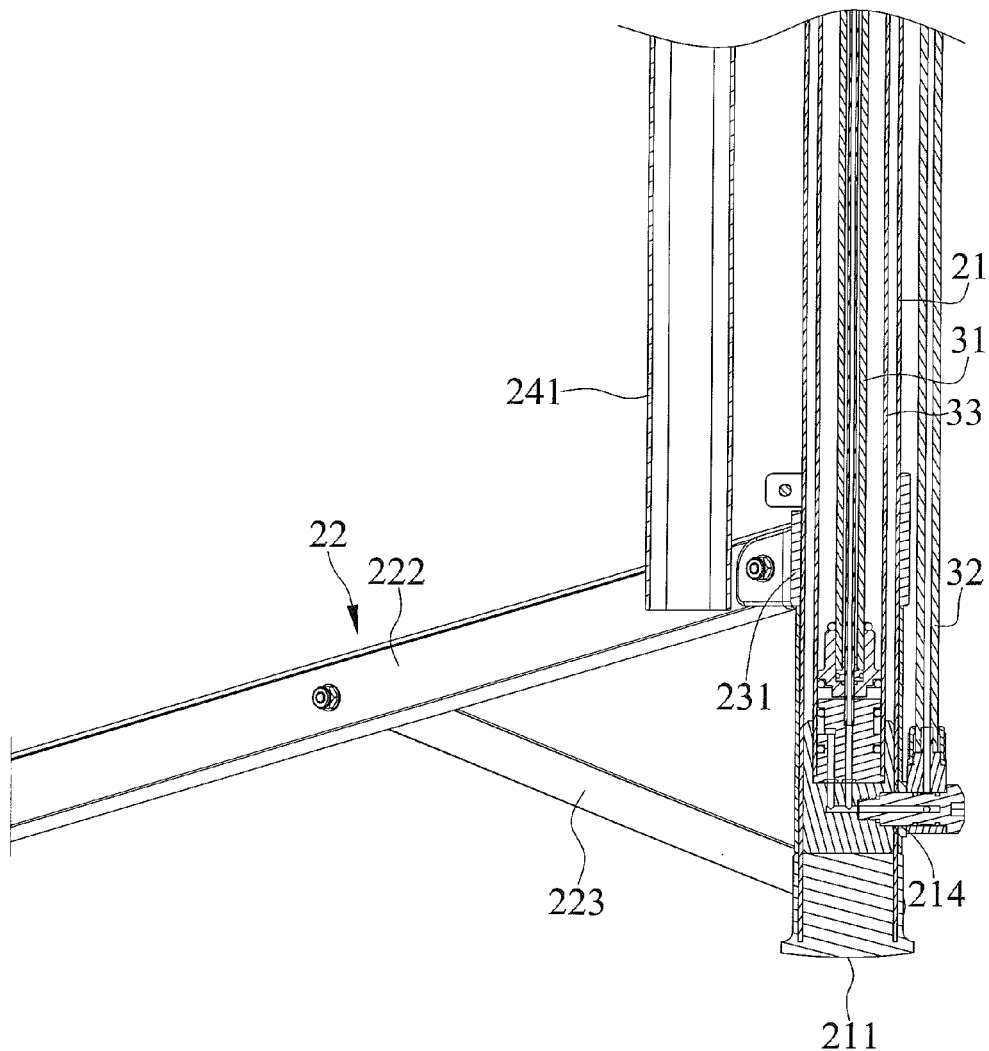
FIG. 5 is a partial, enlarged cross-sectional view of FIG. 4.
Figure 6:
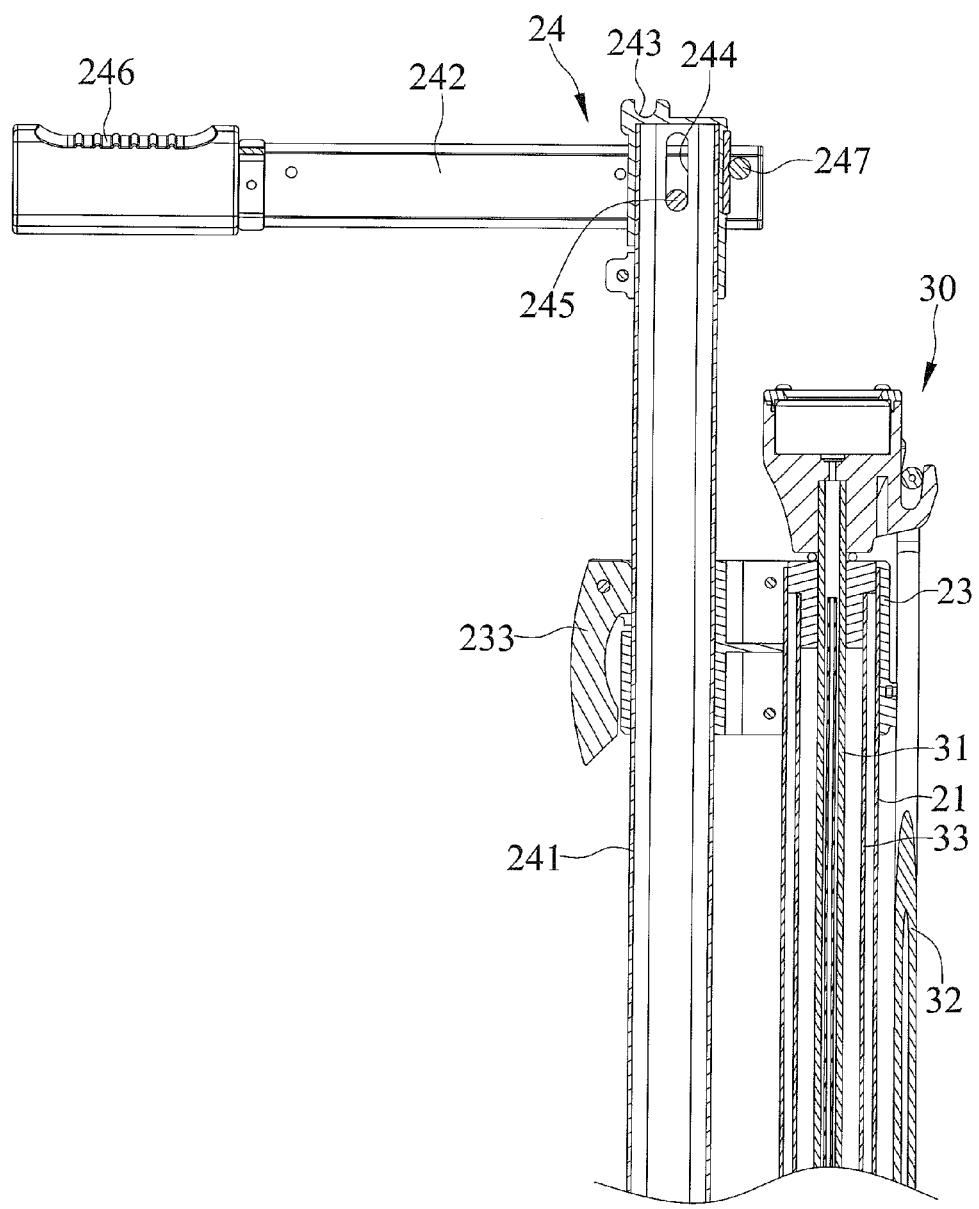
FIG. 6 is another partial, enlarged cross-sectional view of FIG. 4.

FIGS. 1 through 12 show a bike repair stand 10 in accordance with a first embodiment of the present invention.

A main body 20 includes a stand column 21. The stand column 21 has a bottom end 211 and a top end 212 and extends therebetween along a first vertical axis L1, thereby defining a height between the bottom end 211 and the top end 212 and defining a height direction along the first vertical axis L1. The stand column 21 defines a space 213 extending along the first vertical axis L1 from the top end 212 to the bottom end 211 and defines a through hole 214 extending radially to the first vertical axis L1. The through hole 214 has an end open to outside and another end communicated with the space 213.

A leg mechanism 22 is located adjacent to the bottom end 211 of the stand column 21. The leg mechanism 22 includes a slider 221, two first links 222, and two second links 223. The slider 221 is disposed between the bottom and top ends 211 and 212 of the stand column 21 and is able to slide along the first vertical axis L1. Each of the two first links 222 has a first end pivotally joined to the slider 221, a second end adapted to abut the ground, and a median located between the first and second ends. Each of the two second links 223 has a first end pivotally joined to the bottom end 211 of the stand column 21 and a second end pivotally joined to the median of one of the first links 222. The slider 221 is movable on the stand column 21 along the first vertical axis L1 and is configured for causing the first and second links 222 and 223 to extend and to collapse. The leg mechanism 22 is at a deployed position when the first and second links 222, 223 extend, and in which the bike repair stand 10 can stand on the ground firmly and can stably lift a bike 90. The slider 221 is moved downwardly to the deployed position thereof to cause the first link 222 and the second link 223 extend. The leg mechanism 22 can be stored. The leg mechanism 22 has a stored position in which the slider 221 is moved upwardly to cause the first and second links 222 and 223 to collapse. The first and second links 222 and 223 are at a position respectively extending along the two sides of the stand column 21 when the leg mechanism is at the stored position thereof.

A head seat 23 is located adjacent to the top end 212 of the stand column 21. The head seat 23 includes two lugs 231 disposed radially to the first vertical axis L1 and away from the stand column 21 and includes a retaining space 232 extending along the second vertical axis L2. The pole 241 is inserted in the retaining space 232 and is able to move along the second vertical axis L2, thereby being able to move with relative to the stand column 21. The two lugs 231 include a retainer 233 engaged therewith. The retainer 233 is pivotally engaged with the two lugs 231.

Figure 7:
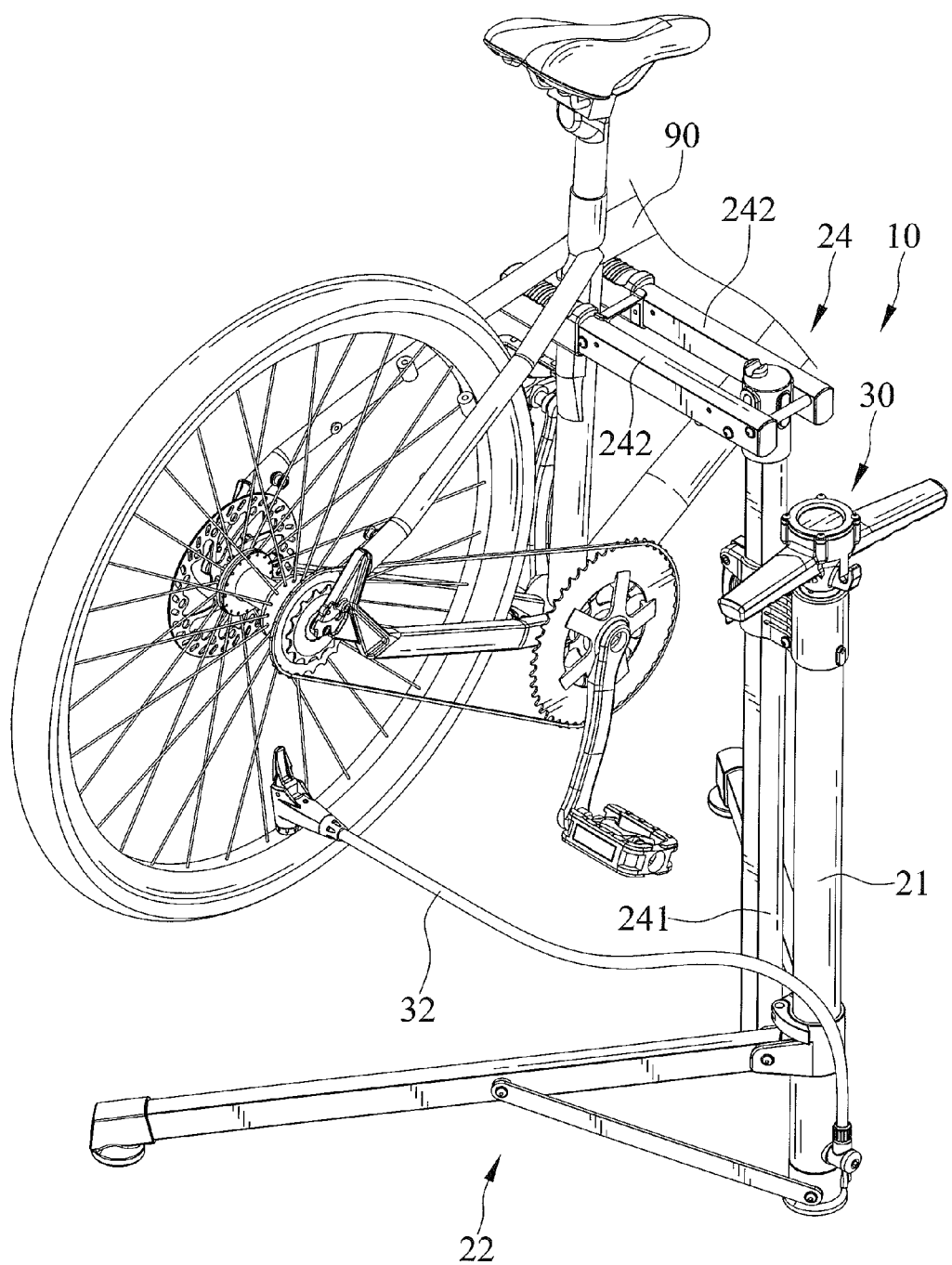
FIG. 7 is a perspective view showing the bike repair stand of FIG. 1 lifting a bike and including a pump system received by the bike repair stand fluidly connecting to the bike.
Figure 8:
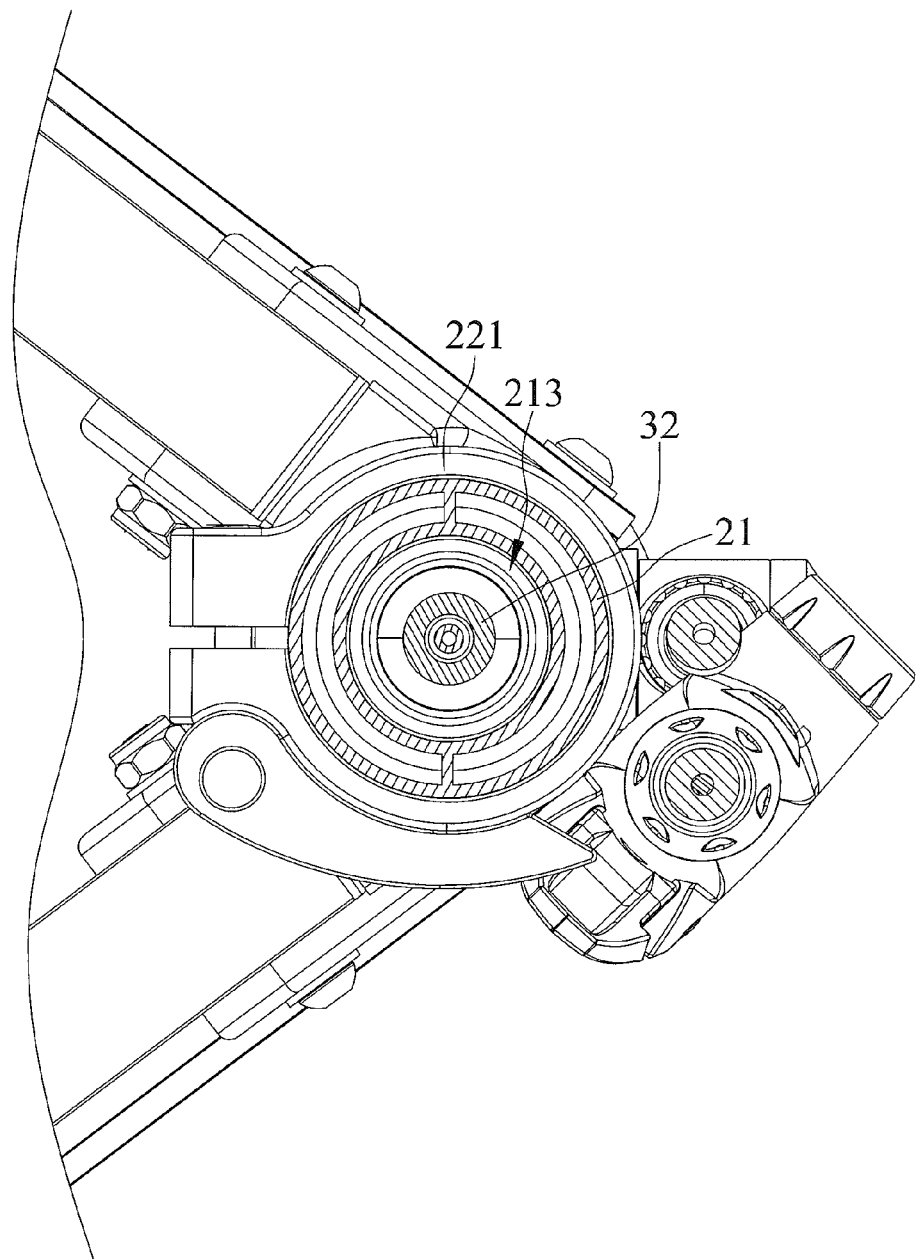
FIG. 8 is a partial, cross-sectional view of FIG. 7.
Figure 9:
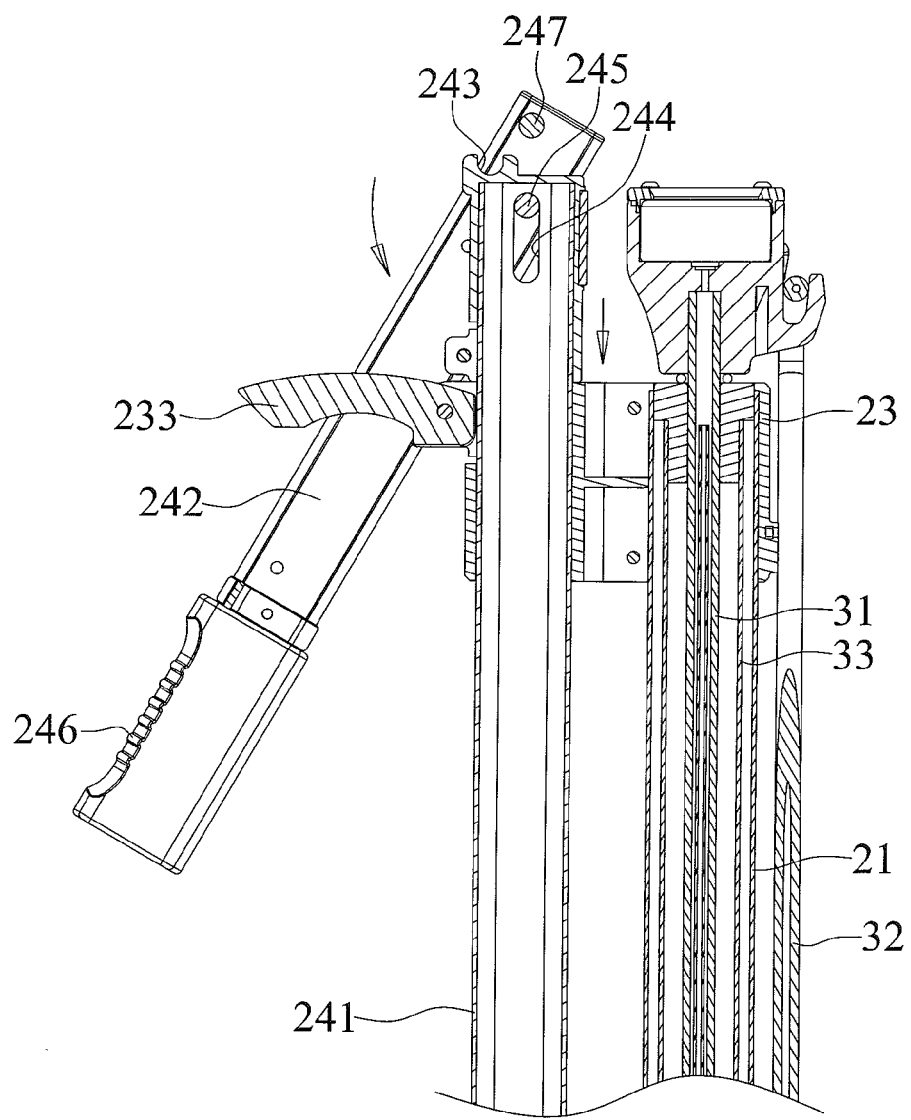
FIG. 9 is a partial, cross-sectional view showing the a support mechanism of the bike repair stand moved form a deployed position in FIG. 6 to a position between the deployed and stored positions thereof.
Figure 10:
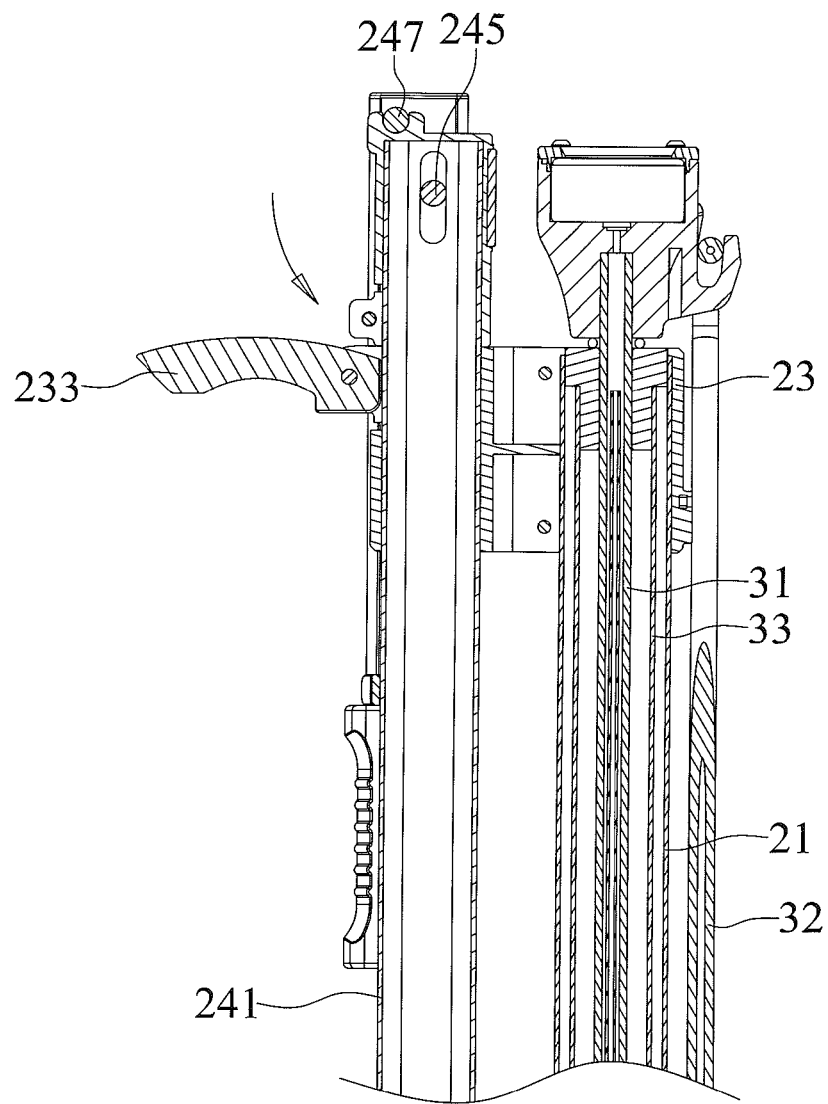
FIG. 10 is a partial, extended cross-sectional view of FIG. 9 and shows the bike repair stand moved to the stored position thereof.
Figure 11:
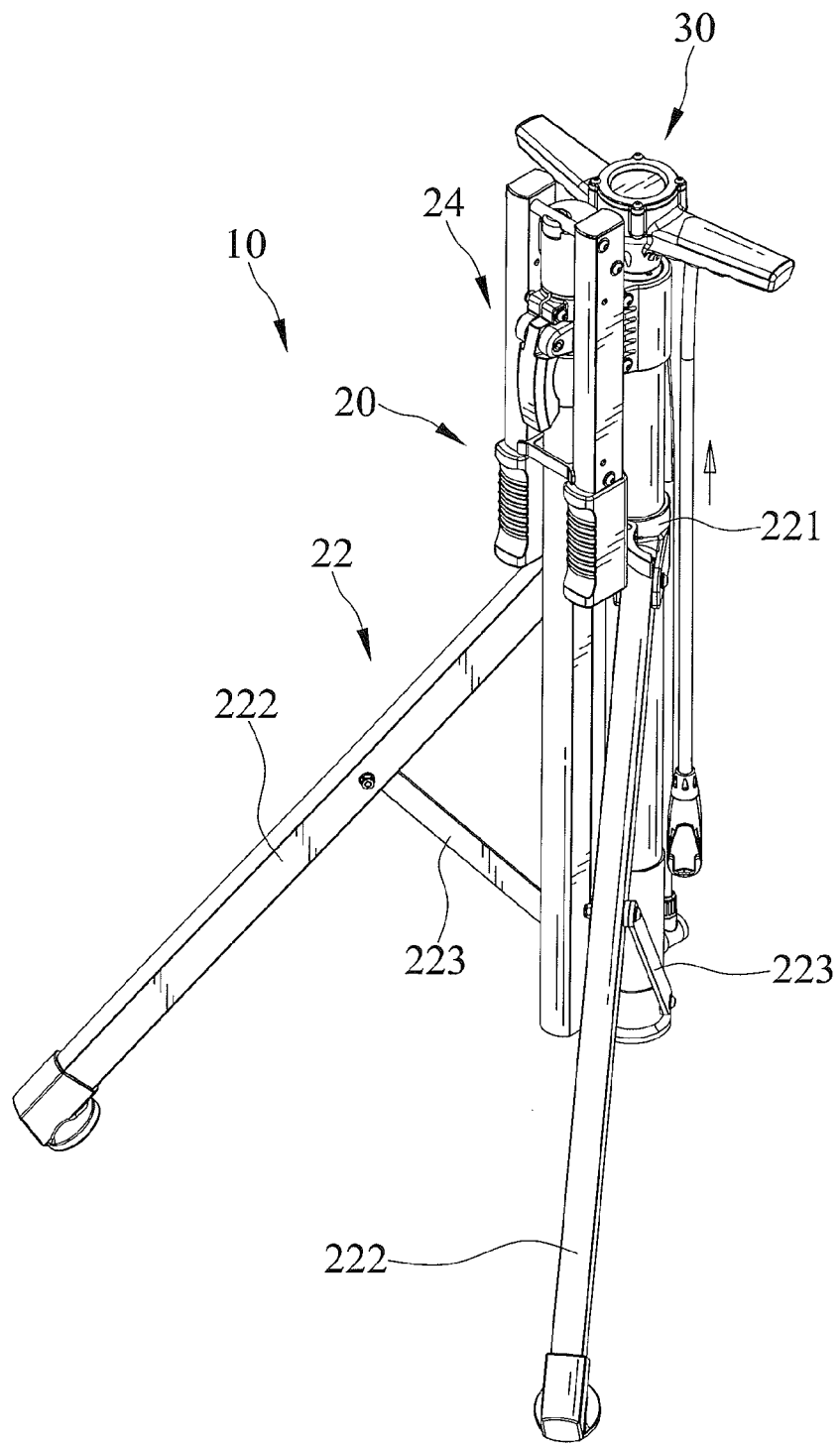
FIG. 11 is a perspective view showing a leg mechanism of the bike repair stand moved from a deployed position in FIG. 1 to a position between the deployed and stored positions thereof.
Figure 12:
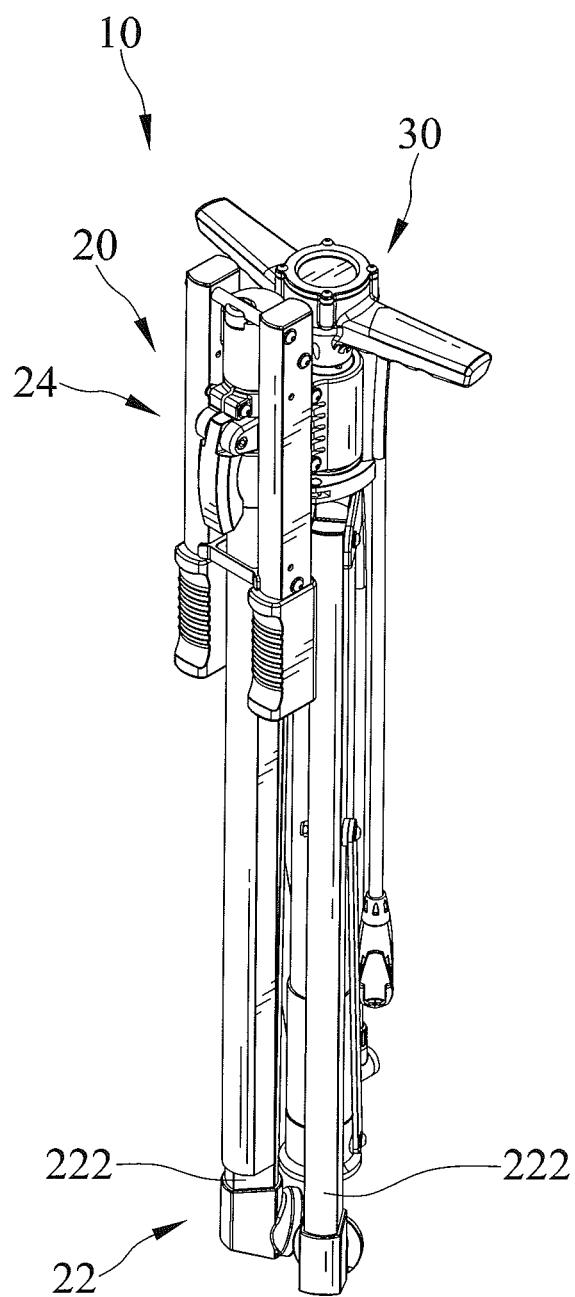
FIG. 12 is a perspective view showing the bike repair stand of FIG. 1 moved to a stored position in which the support mechanism is moved to the stored position thereof and the leg mechanism is moved to the stored position thereof.

A support mechanism 24 includes a pole 241 and two support levers 242. The pole 241 is disposed on the head seat 23 and is able to slide along a second vertical axis L2 such that the pole 241 has relative positions with respect to the stand column 21. The retainer 233 is engaged with the pole 241 and is selectively movable between a first position preventing the pole 241 from moving and a second position allowing the pole 241 to move along the second vertical axis L2. The second vertical axis L2 is parallel to the first vertical axis L1. Therefore, the pole 241 moves parallel to the height direction of the stand column 21. In addition, the pole 241 can be elevated to a height such that the top of the pole 241 is higher than the top end 212 of the stand column 21, or to a height such that the top of the pole 241 and the top end 212 are equal at height, or to a height such that the top of the pole 241 is at lower than the top end 212, to allows the bike repair stand 10 to lift the bike 90 to a desired height, as described later. The pole 241 includes an end thereof defining a recess 243 and a median thereof defining a slot 244. The slot 244 extends through two sides of pole 241 in a direction radial to the second vertical axis L2. The slot 244 is located adjacent to the end of the pole 241 that defines the recess 243. The two support levers 242 are used to engage with the bike 90. In particular, the bike 90 includes a bike frame resting on the two support levers 242, as shown in FIG. 7. The two support levers 242 are disposed side by side and are respectively arranged on the two sides of the pole 241. The two support levers 242 are respectively fixed to two ends of an axle 245. The axle 245 extends radially to the second vertical axis L2. The two support levers 242 are pivotal with respect to the pole 241 about the axle 245. The axle 245 is inserted in the slot 244 and is able to rotate and to slide in the slot 244 along the second vertical axis L2. Each of the support levers 242 defines a support portion 246 at an end. Each of the two support levers 242 are respectively fixed to two ends of a limiter 247. The support portion 246 and the limiter 247 are located on different sides of the axle 245. Each of the support levers 242 has a deployed position in which the limiter 247 abuts a side of the pole 241 which is adjacent to the stand column 21 and the support portion 246 thereof is at a position extending horizontally and away from the stand column 21 and has a stored position in which the limiter 247 disengages from the side of the pole 241 and engages in the recess 243. Furthermore, the two support levers 242 disposed at the stored position thereof are at a position respectively extending along the two sides of the pole 241.

In addition, the bike repair stand 10 includes a pump system 30. In particular, the pump system 30 is connected to the main body 20 of the stand column 21. The pump system 30 is fixedly disposed on the main body 20. The pump system 30 includes a plunger 31 and an air conduit 32. The plunger 31 is inserted in the space 213 and is able to move reciprocally. The air conduit 32 has an end connected to the through hole 214 to communicate with the space 213 and another end that air flows thereout and that includes a valve head to fluidly connect to an object to be inflated. In this embodiment, the object to be inflated is a tire of the bike 90. The pump system 30 also includes a cylinder 33 in which the plunger 31 is inserted. The cylinder 33 is adapted to connect to the stand column 21 in a direction along the first vertical axis L1. The end of the air conduit 32 connected to the through hole 214 is communicated with the cylinder 33.

Figure 13:
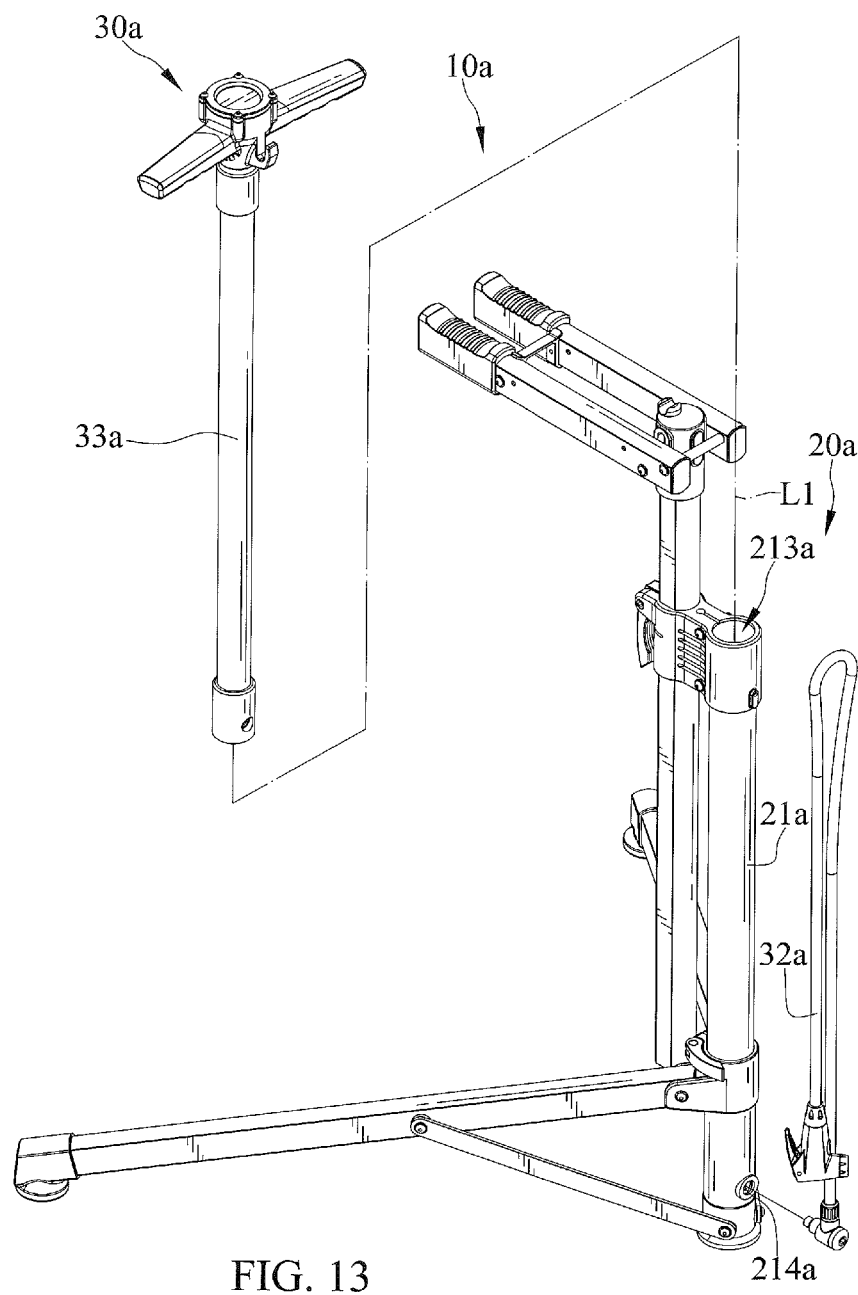
FIG. 13 is an exploded perspective view of a bike repair stand in accordance with a second embodiment of the present invention.
Figure 14:
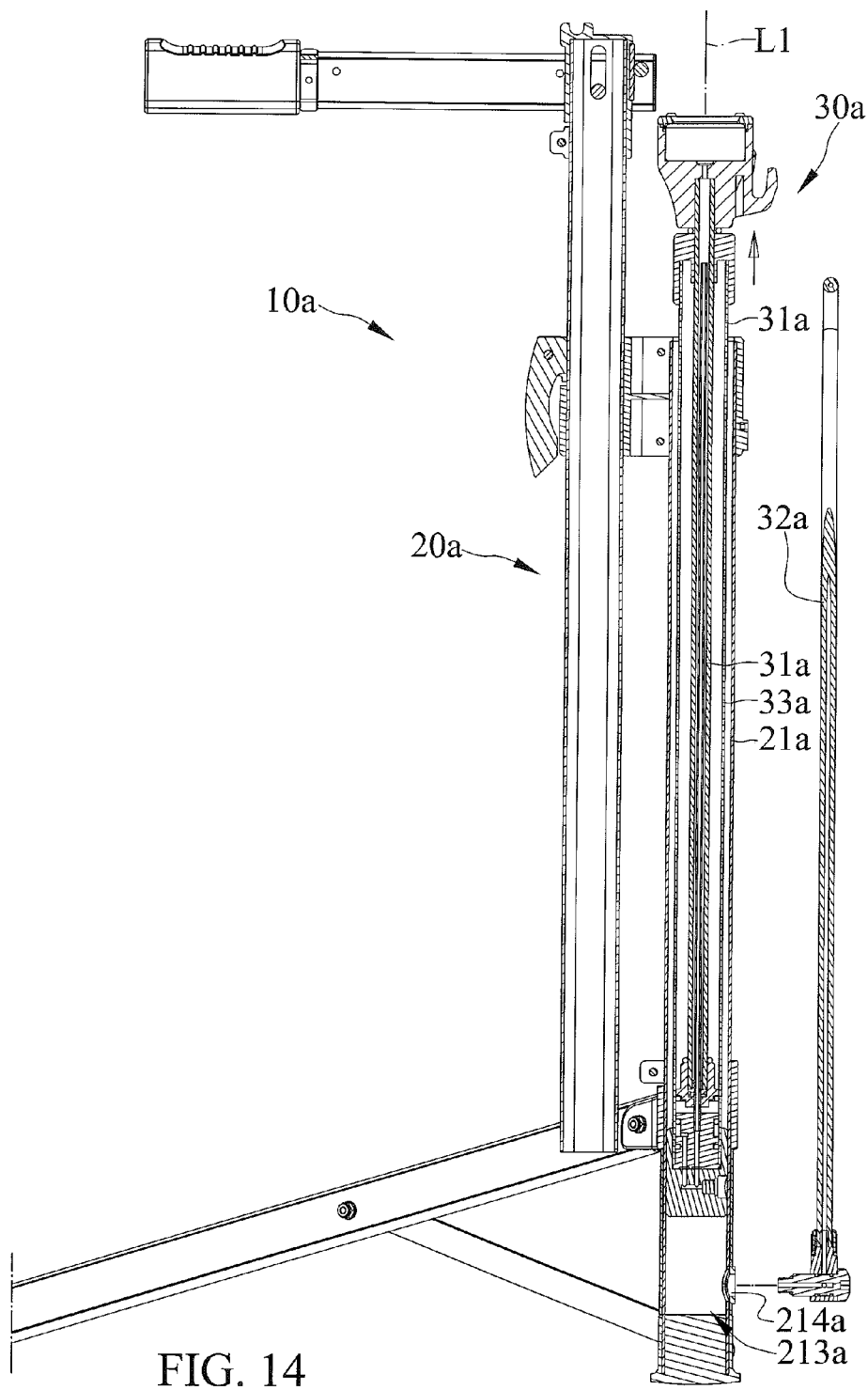
FIG. 14 is an exploded, cross-sectional view of the bike repair stand of FIG. 13.
Figure 15:
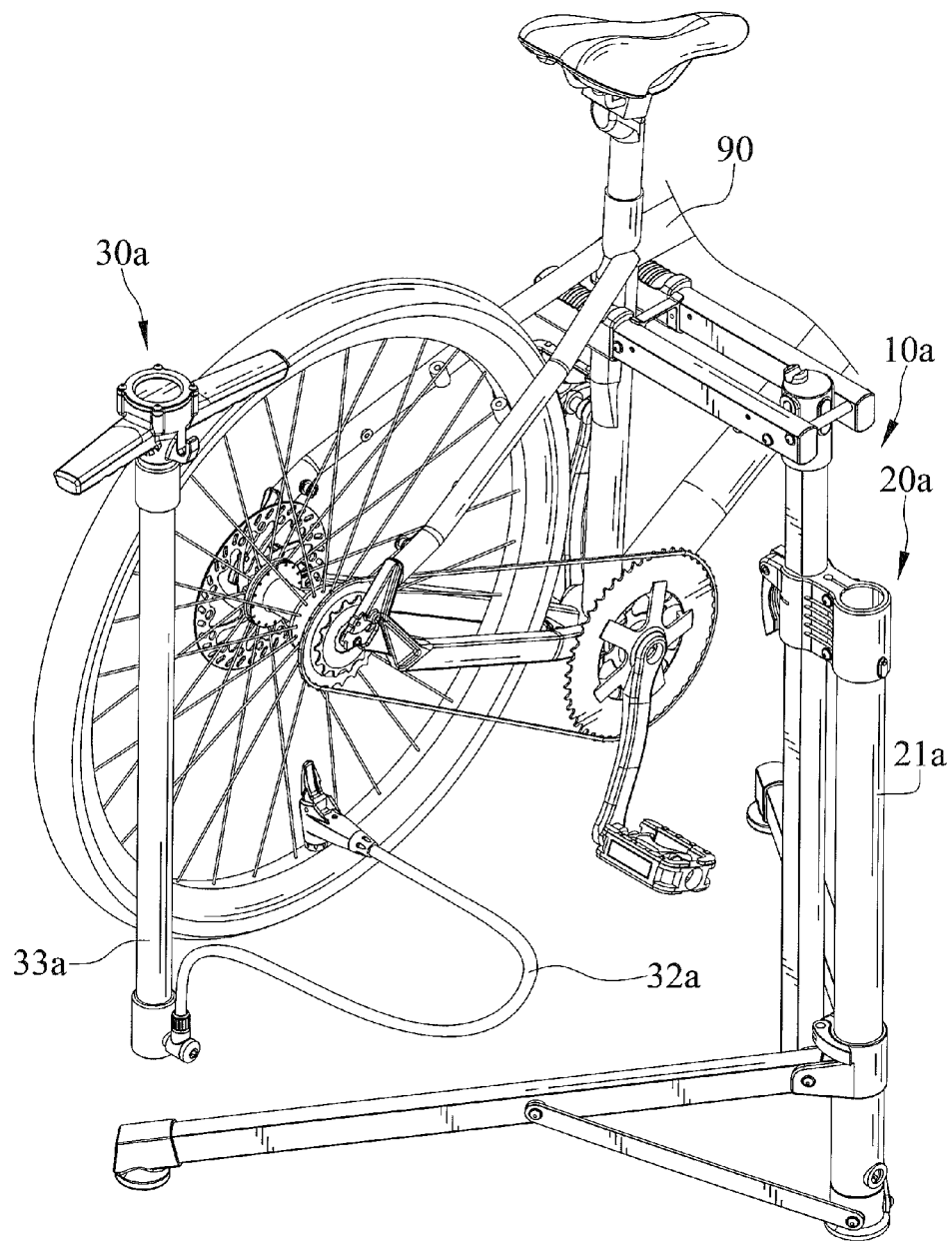
FIG. 15 is a perspective view showing the bike repair stand of FIG. 13 lifting a bike and including a pump system received by the bike repair stand fluidly connecting to the bike.

FIGS. 13 through 15 show a bike repair stand 10a in accordance with a second embodiment of the present invention, and the same numbers are used to correlate similar components of the first embodiment, but bearing a letter a. The bike repair stand 10a differentiates from the bike repair stand 10 in that a pump system 30a is releasably connected to a main body 20a such that a cylinder 33a is able to be disconnected from a space 213a defined by a stand column 21a and an air conduit 32a is able to be disconnected from a through hole 214a defined by the stand column 21a and to directly connect to the cylinder 33a.

In view of the forgoing, the leg mechanism 22 and the support mechanism 24 are at the deployed position thereof when the bike repair stands 10 and 10a lifting the bike 90. The bike 90 is lifted by two support levers 242. The two support levers 242 are symmetrically disposed. Therefore, the bike 90 is stably supported. In addition, the bike repair stands 10 and 10a can be stored. The leg mechanism 22 and the support mechanism 24 are at the stored position thereof, thereby allowing the bike repair stands 10 and 10a to become compact and to occupying small storage space.

The foregoing is merely illustrative of the principles of this invention and various modifications can be made by those skilled in the art without departing from the scope and spirit of the invention.

What is claimed is:

1. A bike repair stand comprising:
a main body including a stand column, wherein the stand column has a bottom end and a top end and extends therebetween along a first vertical axis;
a leg mechanism located adjacent to the bottom end of the stand column and including a slider, two first links, and two second links, wherein the slider is disposed between the bottom and top ends of the stand column and is able to slide along the first vertical axis, wherein each of the two first links has a first end pivotally joined to the slider, a second end adapted to abut the ground, and a median located between the first and second ends, and wherein each of the two second links has a first end pivotally joined to the bottom end of the stand column and a second end pivotally joined to the median of one of the first links;
a head seat located adjacent to the top end of the stand column; and
a support mechanism including a pole and two support levers, wherein the pole is disposed on the head seat and is able to slide along a second vertical axis such that the pole has relative positions with respect to the stand column, wherein the second vertical axis is parallel to the first vertical axis, wherein the two support levers are disposed side by side and are respectively arranged on two sides of the pole, wherein the two support levers are respectively fixed to two ends of an axle, wherein the axle extends radially to the second vertical axis, and wherein the two support levers are pivotal with respect to the pole about the axle.

2. The bike repair stand as claimed in claim 1, wherein the pole includes an end thereof defining a recess and a median thereof defining a slot, wherein the slot extends through the two sides of pole in a direction radial to the second vertical axis, wherein the slot is located adjacent to the end of the pole that defines the recess, wherein the axle is inserted in the slot and is able to rotate and to slide in the slot along the second vertical axis, wherein each of the support levers defines a support portion at an end, wherein each of the two support levers are respectively fixed to two ends of a limiter, wherein the support portion and the limiter are located on different sides of the axle, and wherein each of the support levers has a deployed position in which the limiter abuts a side of the pole which is adjacent to the stand column and the support portion thereof is at a position extending horizontally and away from the stand column and has a stored position in which the limiter disengages from the side of the pole and engages in the recess.

3. The bike repair stand as claimed in claim 2, wherein the two support levers disposed at the stored position thereof are at a position respectively extending along the two sides of the pole.

4. The bike repair stand as claimed in claim 3, wherein the stand column defines a space extending along the first vertical axis from the top end to the bottom end of the stand column and defines a through hole extending radially to the first vertical axis, wherein the through hole has an end open to outside and another end communicated with the space, wherein the main body of the stand column is connected to a pump system, wherein the pump system includes a plunger and an air conduit, wherein the plunger is inserted in the space and is able to move reciprocally, and wherein the air conduit has an end connected to the through hole to communicate with the space.

5. The bike repair stand as claimed in claim 4, wherein the pump system includes a cylinder in which the plunger is inserted, wherein the cylinder is adapted to connect to the stand column in a direction along the first vertical axis, and wherein the end of the air conduit connected to the through hole is communicated with the cylinder.

6. The bike repair stand as claimed in claim 5, wherein the pump system is fixedly disposed on the main body.

7. The bike repair stand as claimed in claim 5, wherein the pump system is releasably connected to the main body such that the cylinder is able to be disconnected from the space and the air conduit is able to be disconnected from the through hole and to directly connect to the cylinder.

8. The bike repair stand as claimed in claim 1, wherein the head seat includes two lugs disposed radially to the first vertical axis and away from the stand column and includes a retaining space extending along the second vertical axis, wherein the pole is inserted in the retaining space and is able to move along the second vertical axis, thereby being able to move with relative to the stand column, wherein the two lugs include a retainer engaged therewith, and wherein the retainer is engaged with the pole and is selectively movable between a first position preventing the pole from moving and a second position allowing the pole to move along the second vertical axis.

9. The bike repair stand as claimed in claim 8, wherein the retainer is pivotally engaged with the two lugs.

10. The bike repair stand as claimed in claim 1, wherein the slider is movable on the stand column along the first vertical axis and is configured for causing the first and second links to extend and to collapse, wherein the slider is moved downwardly to a deployed position in which the first link and the second link extend, and wherein the slider is moved upwardly to a stored position in which the first and second links collapse and are at a position respectively extending along the two sides of the stand column.

* * * * *